US012624212B2

(12) United States Patent
Vashchenko et al.

(10) Patent No.: US 12,624,212 B2
(45) Date of Patent: May 12, 2026

(54) BIS-AZO DYES FOR THIN FILM POLARIZERS AND SYNTHESIS METHOD

(71) Applicant: The Hong Kong University of Science and Technology, Hong Kong (CN)

(72) Inventors: Valerii Vladimirovich Vashchenko, Hong Kong (CN); Olena Vashchenko, Hong Kong (CN); Hoi Sing Kwok, Hong Kong (CN); Cuiling Meng, Huizhou (CN); Yeuk Lung Ho, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 1004 days.

(21) Appl. No.: 17/694,707

(22) Filed: Mar. 15, 2022

(65) Prior Publication Data

US 2023/0295438 A1 Sep. 21, 2023

(51) Int. Cl.
*C09B 39/00* (2006.01)
*G02B 1/08* (2006.01)
*G02B 5/30* (2006.01)

(52) U.S. Cl.
CPC ................ *C09B 39/00* (2013.01); *G02B 1/08* (2013.01); *G02B 5/305* (2013.01)

(58) Field of Classification Search
None
See application file for complete search history.

(56) References Cited

U.S. PATENT DOCUMENTS

| | | | | |
|---|---|---|---|---|
| 4,411,812 | A * | 10/1983 | Aftergut | C09K 19/601 252/299.1 |
| 8,576,485 | B2 | 11/2013 | Kozenkov et al. | |
| 2012/0307363 | A1* | 12/2012 | Kozenkov | G02B 5/305 534/856 |
| 2017/0240782 | A1* | 8/2017 | Suwa | G06F 3/044 |
| 2017/0306237 | A1* | 10/2017 | Morimoto | C09B 39/00 |
| 2018/0074371 | A1* | 3/2018 | Mochizuki | C09B 43/32 |

FOREIGN PATENT DOCUMENTS

| | | | | |
|---|---|---|---|---|
| WO | WO-2021051258 A1 * | 3/2021 | | C09B 33/16 |

OTHER PUBLICATIONS

Vladimir G. Chigrinov et al., Photoalignment of Liquid Crystalline Materials: Physics and Applications, John Wiley & Sons, 2008.
W.C. Yip et al., Photo-patterned e-wave polarizer, 2001, v. 22, pp. 27-32.
Su Pan et al., High-performance Coatable Polarizer by Photoalignment, SID Digest, 2017, pp. 1866-1868.
Su Pan et al., Novel Photoalignment Method Based on Low-Molecular-Weight Azobenzene Dyes and Its Application for High-Dichroic-Ratio Polarizers, ACS Appl. Mater. Interfaces, 2018, v. 10, pp. 9032-9037.
David Bleger et al., Electronic Decoupling Approach to Quantitative Photoswitching in Linear Multiazobenzene Architectures, Journal of Physical Chemistry B, 2011, v. 115, pp. 9930-9940.

* cited by examiner

*Primary Examiner* — Anthony J Frost
(74) *Attorney, Agent, or Firm* — Idea Intellectual Limited; Sam T. Yip

(57) ABSTRACT

A dichroic bis-azo biphenyl dye of the following formula:

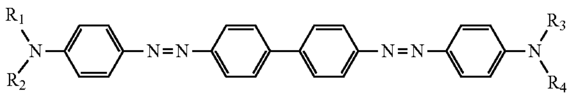

The substituents $R_1$, $R_2$, $R_3$, $R_4$ are alkyl ($C_nH_{2n+1}$) or alkenyl ($C_nH_{2n-1}$) groups with n=1-18. At least one substituent among $R_1R_2R_3R_4$ is different from the other substituents. A benzidine-free method of making a dichroic bis-azo biphenyl dye is provided in which the biphenyl portion of the dye is formed from different first and second mono-azo dyes by a cross-coupling reaction, which may be a Suzuki reaction. A polarizer is formed from a photoaligned layer of the bis-azo biphenyl dye on a substrate and exhibits a dichroic ratio of at least 40. Chemical modification of the photoaligned bis-azo biphenyl dye layer creates a broadband thin film polarizer with low light scattering and high thermal and photo tolerances.

10 Claims, 11 Drawing Sheets

BIS-AZO DYES FOR THIN FILM POLARIZERS AND SYNTHESIS METHOD

FIELD OF THE INVENTION

The present invention relates to thin film polarizers and, more particularly, to thin film polarizers that use bis-azo dyes and methods for their production.

BACKGROUND

Display technologies are evolving towards thin, flexible and foldable displays; these displays require polarizers, typically thin film polarizers. Several approaches to film polarizer exist; for absorptive polarizes, one technique uses a dichroic dye coated on a substrate and aligned with a photoalignment technique. This type of polarizer may be fabricated with a thickness of less than 0.5 micron and a high dichroic ratio (DR).

Among the numerous dichroic dyes, the bis-azo derivative of benzidine-4,4'-(biphenyl-4,4'-diylbis(diazene-2,1-diyl))bis(N,N-dibutylaniline), named AD1, is characterized by a unique high individual dichroism in photooriented films (DR up to 90). Chemically modified AD1 films, e.g., by protonation, show increased absorption in the visible and near infrared region as well as resistance to light exposure; these modified films may be used in the manufacture of broad band polarizers.

However, film polarizers based on AD1 in either protonated or basic form, have several disadvantages. Aligned AD1 films have a rather high level of light scattering, which further increases after chemical modification thus degrading the optical quality of the polarizer. The addition of plasticizers during the film fabrication weakly impacts the light scattering but significantly reduces the dichroic ratio. Variation in solvents and/or temperature during film preparation does not lead to the desired improvement in film quality.

Further, the dichroic ratio of AD1 films critically depends on the AD1 chemical purity. The highest dichroic ratio values are achieved only when more materials of more than 99% purity material are used; however various impurities (such as those intrinsically formed during AD1 synthesis via benzidine, which are difficult to remove) in amounts as small as 3% reduce the dichroic ratio of the resulting AD1 film to below 10. Therefore, purification of the dichroic dyes, or development of new method of their synthesis that avoid difficult-to-remove impurities, are critical for polarization film fabrication.

A commonly-employed AD1 synthesis technique involves the diazotization of benzidine (1,1'-biphenyl-4,4'-diamine) followed by azo-coupling reactions with N,N-dibutyl aniline (see FIG. 3). The crude product isolated from the reaction mixture contains large amounts of various colored impurities, which have similar physical properties to the target product. Purification via multiple recrystallizations and/or flash-chromatography are commonly used, but these methods yield AD1 with a purity <97%, and a dichroic ratio <10. Only purification of AD1 by preparative column chromatography provides a material of the required purity and high dichroic ratio. However preparative column chromatography is costly both in terms materials and processing time.

It is important to note that the starting material for the synthesis of AD1, benzidine, is a hazardous chemical, because it is a human carcinogen. Therefore, recent years have seen a significant reduction in the use of benzidine in commercial processes. Thus, there is a need for alternatives to the use of benzidine to fabricate dichroic dyes.

Among dichroic dyes with fundamentally different structures to AD1, there are not dyes that provide the benefits of AD1 without its weaknesses. Further, it has been determined that even small modifications to the core structure of the AD1 molecule (e.g., the introduction of side substituents in benzene rings or replacement of benzene rings with naphthalene) significantly worsen the dichroism of the new dyes. Therefore, the search for new dye structures similar to the AD1 structure (AD1-like dyes), combining an ability to photo-align with lower crystallinity is a challenge.

Thus, there is a need in the art for alternatives to AD1, that is, "AD1-like" new materials, which are free from the above-mentioned disadvantages. This invention provides such materials, along with benzidine-free manufacturing techniques.

Summary of the Invention

The present invention provides new high dichroic ratio bis-azo dyes, an ecologically friendly method of their synthesis with high purity reaction products, and the use of the dyes in thin film polarizers. The new high dichroic ratio azo dyes are derivatives of 4,4'-Bis(4-N,N-dialkylaminophenylazo)-biphenyl with different lengths of alkyl substituents in the amino groups. The different lengths of the alkyl substituents create an asymmetrical structure of the bis-azo dyes, resulting in high optical quality/low haziness of the polarizers.

The ecologically friendly method of bis-azo dye synthesis includes formation of the central biphenyl fragment of the dye from two different mono-azo dyes by means of a cross-coupling reaction. The method provides a safe, benzidine-free, synthetic approach to forming bis-azo biphenyl dyes having both symmetrical and unsymmetrical structures. The impurities accompanying the formation of the bis-azo dyes are easier to remove than the impurities from synthesis using benzidines. As such, the bis-azo dyes can be made to possess high purity using simpler and more convenient purification treatments compared to methods based on azo-coupling with benzidines.

The thin films of the inventive bis-azo dyes are readily susceptible to photoalignment; illumination of deposited thin films by polarized UV or blue light induces high dichroism. Further chemical modification of the thin films (e.g., protonation) creates broad-band thin film polarizers. The thin film polarizers from new bis-azo dyes after photoalignment and chemical modification demonstrate good optical quality with low light scattering, high dichroic ratio, and stability to heat and light exposure.

In one aspect, the present invention provides an absorptive thin film polarizer. The polarizer includes a substrate and an aligned dye layer of at least one type of dichroic bis-azo biphenyl dye, 4,4'-Bis(4-dialkylaminophenylazo)-biphenyl, of the following formula:

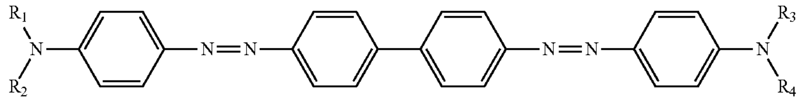

The substituents $R_1$, $R_2$, $R_3$, $R_4$ are alkyl ($C_nH_{2n+1}$) or alkenyl ($C_nH_{2n-1}$) groups with n=1-18. At least one substituent among $R_1R_2R_3R_4$ is different from the other substituents.

In another aspect, the aligned dye layer is a photoaligned dye layer.

In another aspect, a dichroic ratio of the thin film polarizer is more than 40.

In another aspect, the haziness of the thin film polarizer is less than 2%.

In another aspect, the aligned dye layer is a protonated aligned dye layer.

In another aspect, a protective layer is positioned over the aligned dye layer.

In another aspect, the substrate is a flexible substrate.

In another aspect, the flexible substrate is a polymeric substrate.

In another aspect, a display includes the thin film polarizer of claim 1.

The present invention further provides a benzidine-free method of making a dichroic bis-azo biphenyl dye having a formula:

In another aspect a protective layer is deposited over the dichroic bis-azo biphenyl dye.

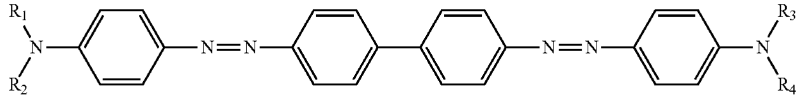

wherein the substituents $R_1$, $R_2$, $R_3$, $R_4$ are alkyl ($C_nH_{2n+1}$) or alkenyl ($C_nH_{2n-1}$) groups and n=1-18. A biphenyl portion of the bis-azo dye is formed from first and second mono-azo dyes by a cross-coupling reaction; the first and second mono-azo dyes are different from each other.

In another aspect, the first mono-azo dye is a bromoazobenzene dye.

In another aspect, the second mono-azo dye is boronic ester derivative of azobenzene.

In another aspect, the boronic ester derivative of azobenzene is formed by borylating a bromoazobenzene dye.

In another aspect, the cross-coupling reaction is Suzuki reaction.

In another aspect, the dichroic bis-azo biphenyl dye is purified.

Figure 8B:
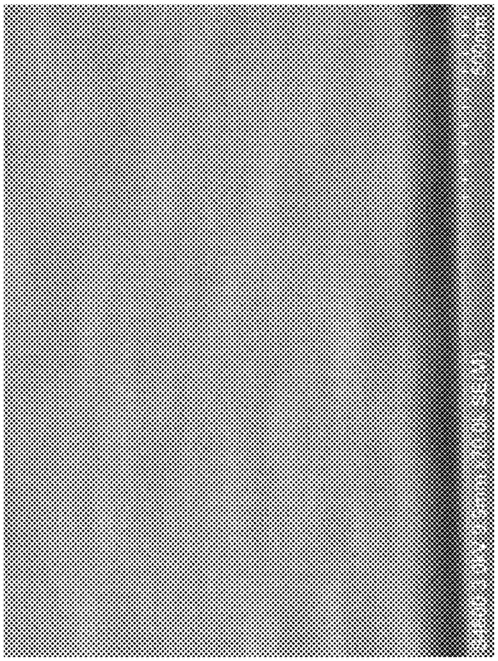
Figure 8A:
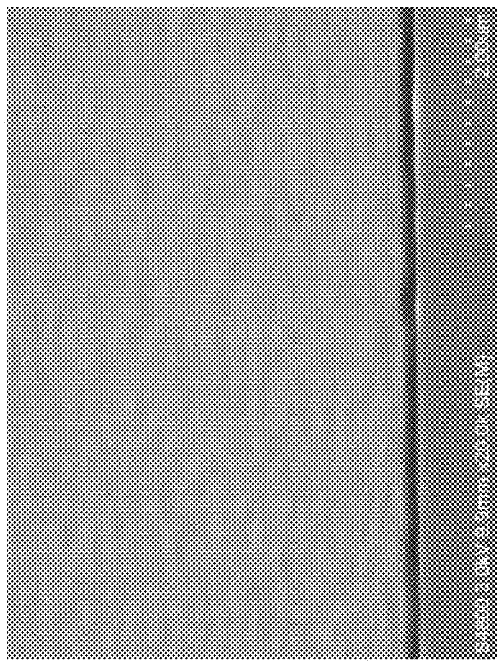

FIGS. 8A-8B shows SEM images of thin films of an inventive dichroic dye (AD45) before protonation.

Figure 9B:
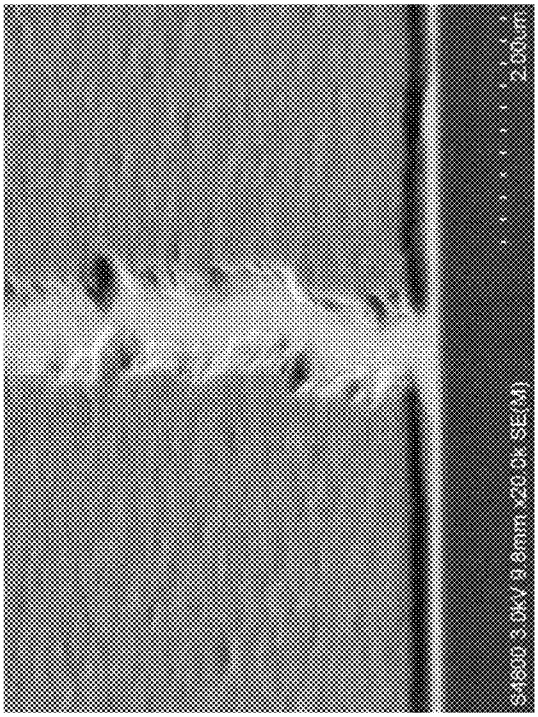
Figure 9A:
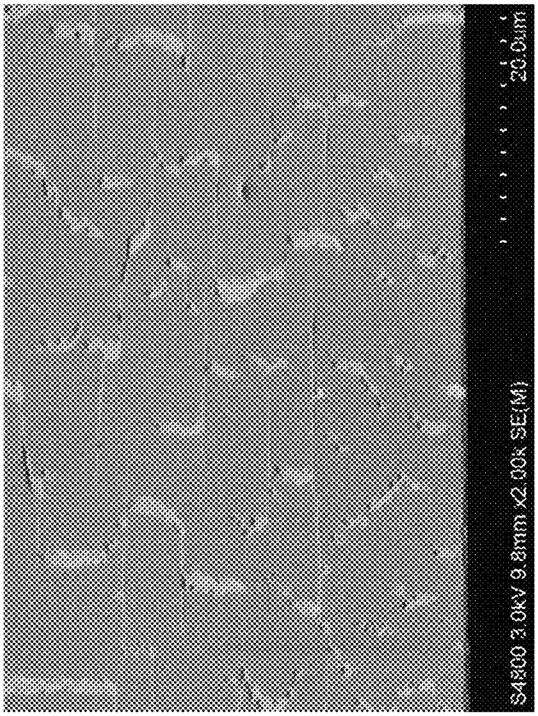

FIGS. 9A-9B show SEM images of thin film of an inventive dichroic dye (AD45) after protonation.

Figure 2:
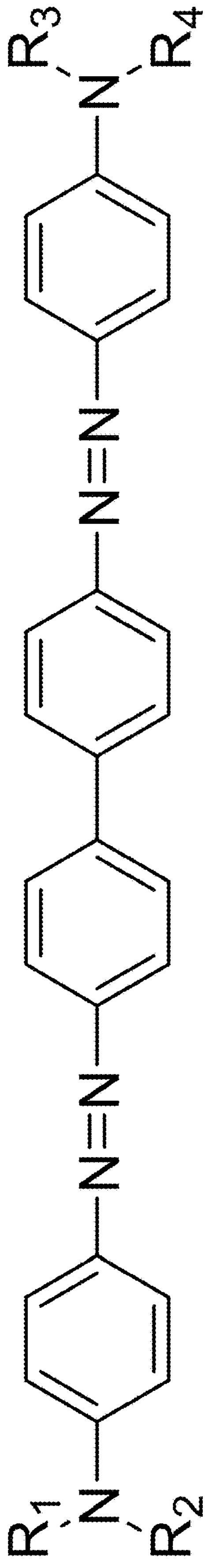
FIG. 2 shows the general formula/molecular structure of the dichroic dyes of the present invention in which $R_1$, $R_2$, $R_3$, $R_4$ are alkyl ($C_nH_{2n+1}$) or alkenyl ($C_nH_{2n-1}$) chains, n=1-18; and at least one group among of $R_1$-$R_4$ is not equal to other in any combination.
Figure 10:
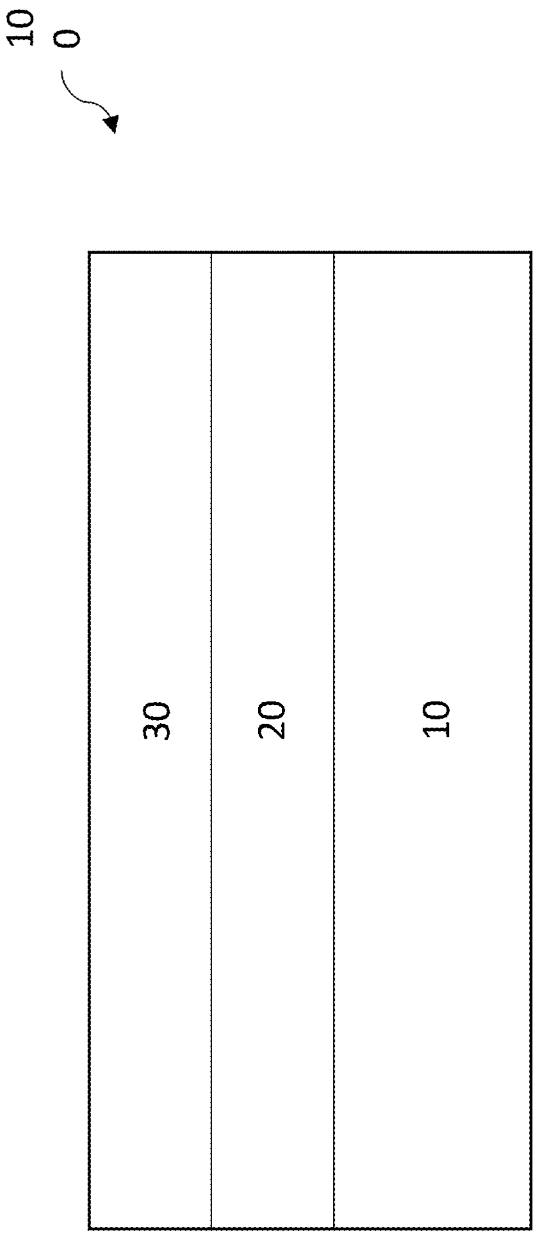

FIG. 10 schematically depicts a polarizer of the present invention using the dichroic dyes of FIG. 2.

DETAILED DESCRIPTION

Figure 1:
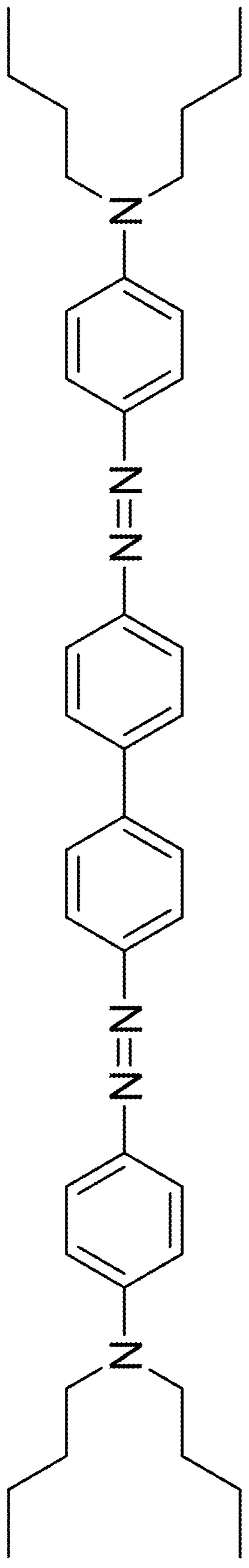
FIG. 1 (prior art) shows the molecular structure of dichroic dye AD1.

A novel dichroic bis-azo biphenyl dye is provided. The novel dyes are derivatives of 4,4'-bis(4-aminophenylazo)-biphenyl (termed "AD1"), a compound with the structure shown in FIG. 1. The novel compounds have the following formula:

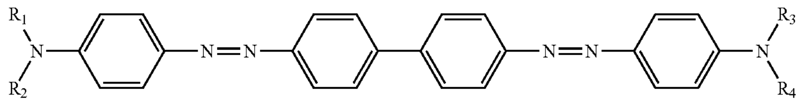

In another aspect, one substituent among $R_1R_2R_3R_4$ is different from the other substituents.

In another aspect, the dichroic bis-azo biphenyl dye is deposited on a substrate and photo-aligned with polarized light.

In another aspect, the dichroic bis-azo biphenyl dye is protonized.

The substituents $R_1$, $R_2$, $R_3$, $R_4$ are alkyl ($C_nH_{2n+1}$) or alkenyl ($C_nH_{2n-1}$) groups with n=1-18. At least one substituent among $R_1R_2R_3R_4$ is different from the other substituents.

The new compounds distinguish from the parent AD1 structure by having different length of alkyl substituents in the amino groups. The compounds typically have either asymmetrical left and right portions (different lengths of $R_1$, $R_2$ and $R_3$, $R_4$) or have the same left and right portions, but different alkyl substituents attached to the same nitrogen atom in an aniline unit (different $R_1$ and $R_2$ or different $R_3$ and $R_4$); alternatively, each of the $R_1$-$R_4$ substituents may be different from each other.

Examples of compounds formed from the above formula are shown in Table 1, below:

TABLE 1

Examples of bis-azo biphenyl dyes according to the formula of FIG. 2

| Entry | Short name | Substituents in formula of FIG. 2 | | | |
|---|---|---|---|---|---|
| | | $R_1$ | $R_2$ | $R_3$ | $R_4$ |
| 1 | AD45 | $C_4H_9$ | $C_5H_{11}$ | $C_4H_9$ | $C_5H_{11}$ |
| 2 | AD46 | $C_4H_9$ | $C_6H_{13}$ | $C_4H_9$ | $C_6H_{13}$ |
| 3 | AD44-55 | $C_4H_9$ | $C_4H_9$ | $C_5H_{11}$ | $C_5H_{11}$ |
| 4 | AD55 | $C_5H_{11}$ | $C_5H_{11}$ | $C_5H_{11}$ | $C_5H_{11}$ |
| 5 | AD1 (prior art, FIG. 1) | $C_4H_9$ | $C_4H_9$ | $C_4H_9$ | $C_4H_9$ |

In the examples of Table 1, $R_1$ and $R_3$ are the same and $R_2$ and $R_4$ are the same for compounds 1 (AD45) and 2 (AD46). In compound 3, $R_1$ is the same as $R_2$ and $R_3$ is the same as $R_4$. In compound 4, $R_1$, $R_2$, $R_3$, and $R_4$ are the same. Compound 5 is the prior art compound. It is noted that these compounds are merely examples and other compounds may be formed including those in which each of $R_1$, $R_2$, $R_3$, and $R_4$ are different.

Figure 3:
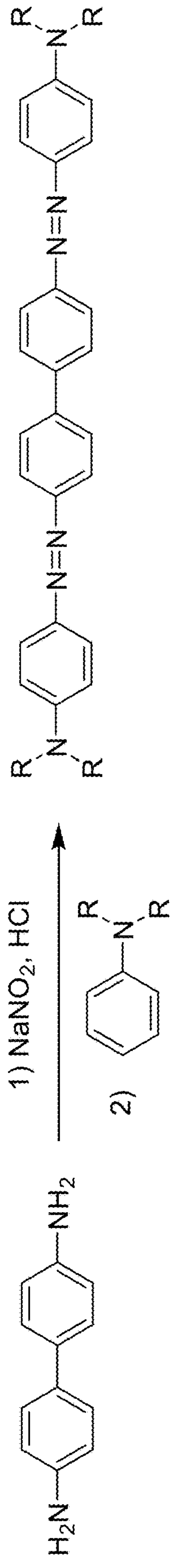
FIG. 3 (prior art) shows a conventional synthesis process for AD1 and symmetrical bis-azo dyes.

The present invention also provides novel methods of synthesis of both the inventive and prior art dyes. The conventional method of bis-azo dyes synthesis involves diazotization of benzidine (1,1'-biphenyl-4,4'-diamine) followed by azo-coupling reactions with N,N-dialkyl anilineis (see FIG. 3). This method is well studied and widely used in the manufacture of azo dyes. However, this conventional method synthesizes only symmetrical molecules, where the left and right sites are equal, that is $R_1{=}R_2{=}R_3{=}R_4$ or $R_1{=}R_3$, $R_2{=}R_4$, $R_1{\neq}R_2$, $R_3{\neq}R_4$. Asymmetrical diphenyl bis-azo dyes with unequal left and right portions of the molecule are impossible to be fabricated from benzidine precursors. Further, the conventional method results in the formation of difficult-to-remove impurities and involves carcinogenic benzidine as a starting material.

In the novel method of the present invention, the biphenyl unit in the bis-azo dye is formed from first and second mono-azo dyes by a cross-coupling reaction; the first and second mono-azo dyes are different from each other. One of the mono-azo dyes may include a halogen atom at a reactive site. Another mono-azo dye may be a derivative of boronic acid. An example of mono-azo dyes that may be used include a bromoazobenzene dye and a boronic ester derivative of azobenzene. As used herein, the term "azo compound" or "azo dye" relates to any compound that is a derivative of diazene, HN═NH, where both hydrogens are substituted by hydrocarbyl groups. In particular, azo compounds may have a diazinyl functional group R—N═N—R', in which R and R' can be either aryl or alkyl.

In one embodiment, the cross-coupling reaction may be a Suzuki cross-coupling reaction. A Suzuki reaction typically involves coupling partners such as a boronic acid and an organohalide and occurs in the presence of a palladium-containing catalyst.

Figure 4:
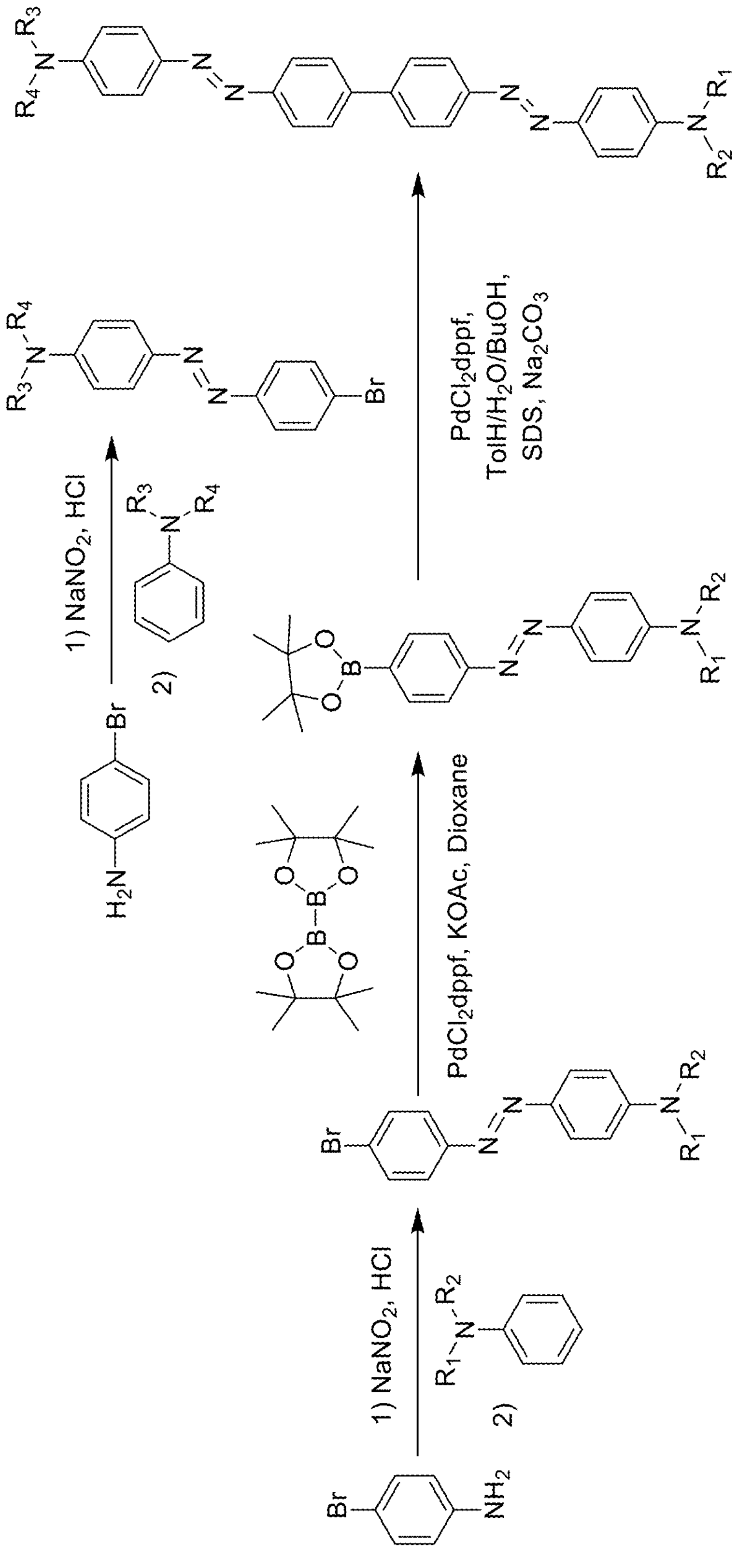
FIG. 4 is an overview of a benzidine-free synthesis of bis-azo bipenyl dyes.
Figure 5B:
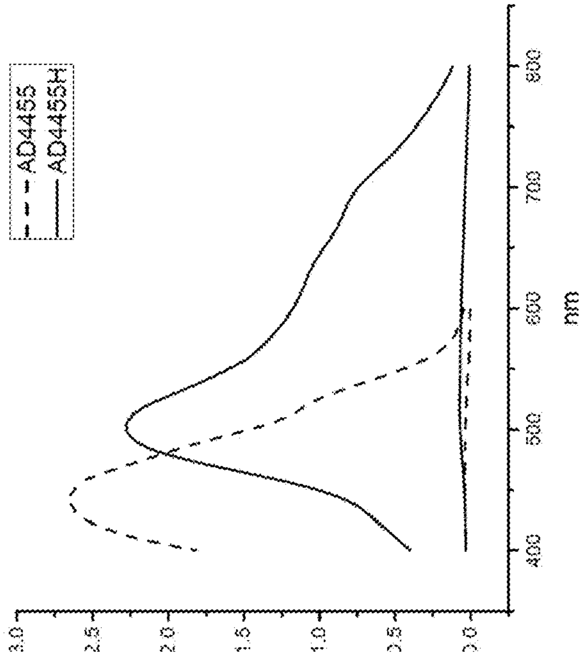
FIGS. 5A-5D show the UV-VIS spectra of the thin films made of the inventive bis-azo dyes before (dashed line) and after (solid line) a protonation procedure.
Figure 5A:
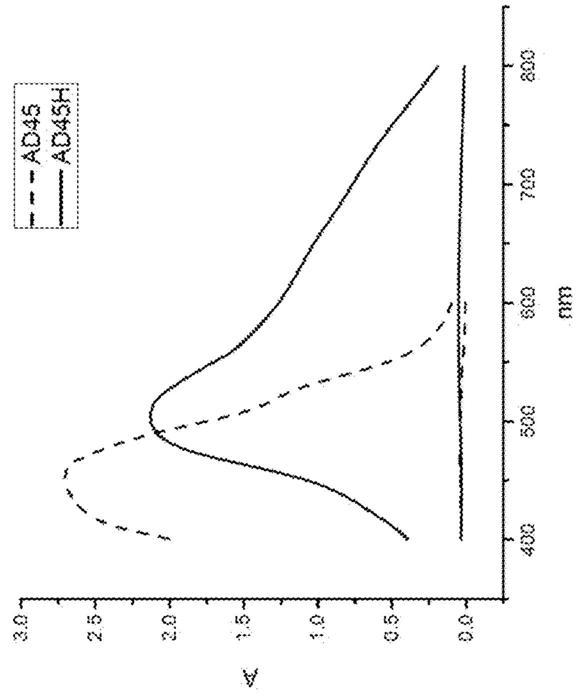
Figure 5C:
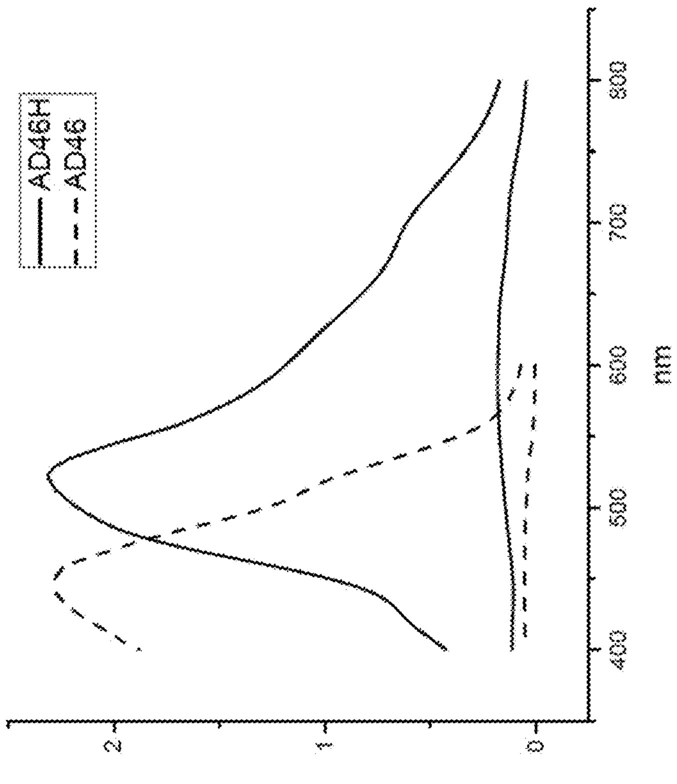
Figure 5D:
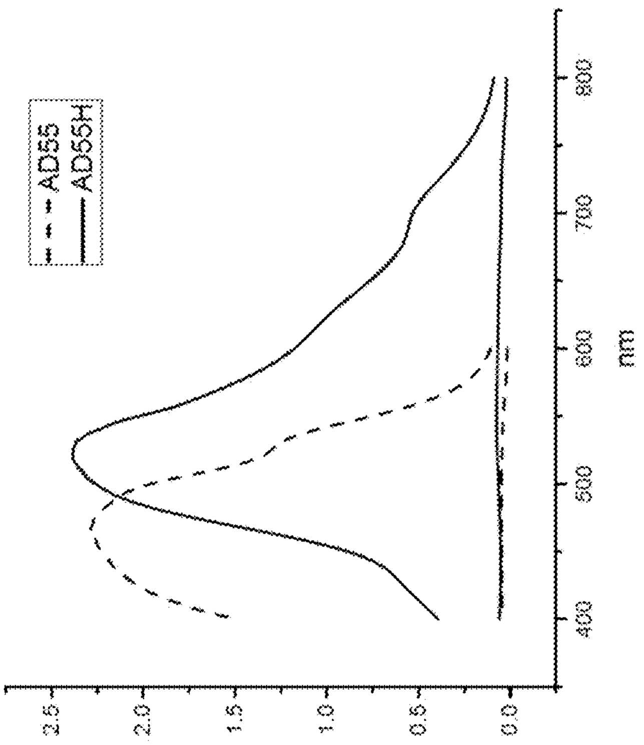

In one embodiment, the method of FIG. 4 is performed. The method of FIG. 4 includes the following:

1. Synthesis of Mono-Azo Precursors
   - i) A bromoazobenzene dye is synthesized by diazotization of 4-bromoaniline following by azo-coupling with an appropriate N,N-dialkylaniline;
   - ii) A boronic ester derivative of azobenzene is synthesized by borylation of the bromoazobenzene;
2. Bis-Azo Biphenyl Dyes Synthesis:
   - iii) cross-coupling reaction/Suzuki reaction of the bromoazobenzene (obtained at step (i)) with boronic ester azobenzene (obtained at step (ii)).

The residual impurities from the chemical reactions, have substantially different solubilities from the desired bis-azo dye product of the reaction. Consequently, in order to obtain the target bis-azo dye at an acceptably high purity, simple purification techniques may be used. For example, the bis-azo dye may be purified by flash chromatography of the reaction product on short plug of silica gel, followed by re-crystallization of the product from an appropriate solvent. Detailed techniques are described in the Examples.

The yields of purified bis-azo dyes are within the 35-40% range. In the case of symmetrical bis-azo dyes (where $R_1{=}R_2{=}R_3{=}R_4$ or $R_1{=}R_3$, $R_2{=}R_4$, $R_1{\neq}R_2$, $R_3{\neq}R_4$), these yields are similar to those obtained by the conventional benzidine method. However, the inventive method may also be used to fabricate asymmetrical bis-azo dyes (using two different mono-azo precursors). Further, the inventive method requires fewer resources because high purity substance may be obtained by uncomplicated purification procedures; there is no need to employ the preparative column chromatography purification of the conventional AD1 synthesis. While the above technique may be used to form the inventive compounds, it may also be used for product synthesis of symmetrical bis-azo dyes, including AD1. Advantageously, the method of the present invention does not involve the toxic starting material benzidine.

FIG. 10 depicts a polarizer 100 according to the present invention. The polarizer includes substrate 10, dichroic dye layer 20, and optional protective layer 30. The substrate 10 may be selected from a variety of substrates including glass, polymers, various liquid crystal layers, color filters, etc. In one aspect, the substrate 10 may be a flexible polymeric substrate that is bendable such that the polarizer 100 may be employed in a foldable display.

Dichroic dye layer 20 includes one or more dyes from the formula depicted in FIG. 2. The dye may be deposited through a variety of thin film techniques such as spin coating. In spin coating, the dye is dispersed in a suitable solvent, typically an organic solvent, and the dye-laden solvent is deposited on a substrate which is spun to create an even layer of coating material by centrifugal force. Other techniques may be used such as spray coating roller coating, dip coating, etc. The thickness of layer 20 may range from approximately 40 nm to 1000 nm.

Following solvent evaporation, the dye layer 20 is photoaligned. The photoalignment technique used may be that disclosed in Pan et al., "High performance coatable polarizer by photoalignment", *SID Digest*, pp. 1866-1868, 2017, the disclosure of which is incorporated by reference herein. In this photoalignment technique, the layer 20 is exposed to polarized light in order to reorient the dye molecules in a direction perpendicular to the coat able polarized light. The polarized light source may be a polarized layer having a central wavelength of 442 nm, although other light sources may be used. The contrast ratio of the coat able two polarizations is 500. The dichroic ratios of the inventive dyes in layer 20 following photoalignment are in the range 40-70 (see Table 2, in the Examples, below).

Following photoalignment, layer 20 is optionally subjected to further chemical modification in order to create a broad band thin film polarizer which is stable when subjected to irradiation by visible or UV light. In one aspect the further chemical processing is protonation. The process used may be the same or similar to those disclosed in published patent application WO 2021/051258 A1, the disclosure of which is incorporated by reference herein. The chemical modification/protonation is achieved by treatment with an acid or its derivative (which can generate an acid, such as an acid anhydride), and simultaneously or sequentially treated with water; the treatment is typically performed in the gaseous phase. Examples of acids that may be used include hydrogen halide acid, nitric acid, sulfuric acid, phosphoric acid, aryl sulfonic acid, alkyl sulfonic acid, halogenated sulfonic acid, trifluoromethanesulfonic anhydride, and halogen-containing carboxylic acid. Prior to chemical modification the azo dye layer 20 exhibits relatively narrow absorption in the blue spectral region; following chemical modification/protonation, the layer 20 exhibits broad absorption and red-shifted absorption in the visible spectral region.

Figure 6B:
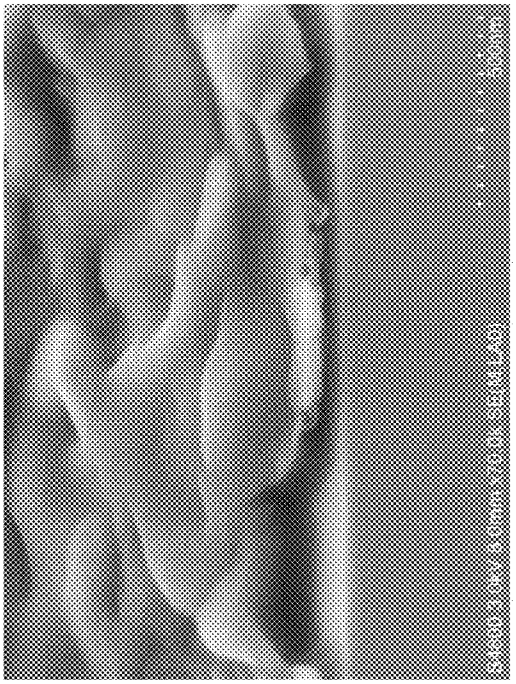
FIGS. 6A-6B (prior art) show SEM images of conventional AD1 dichroic dye before its protonation.
Figure 6A:
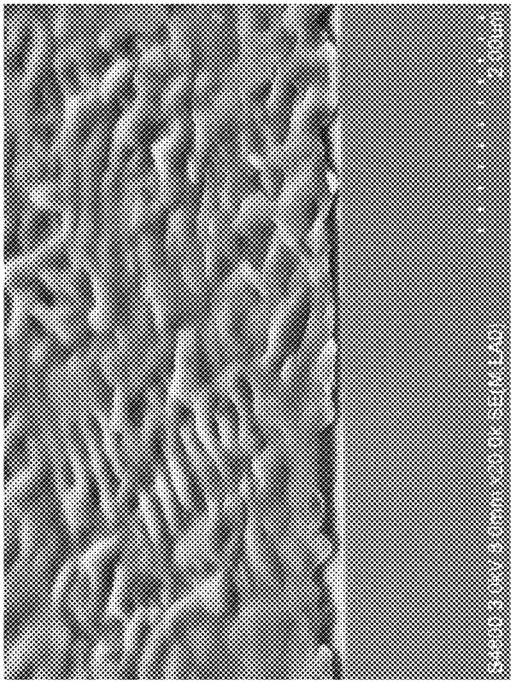
Figure 7B:
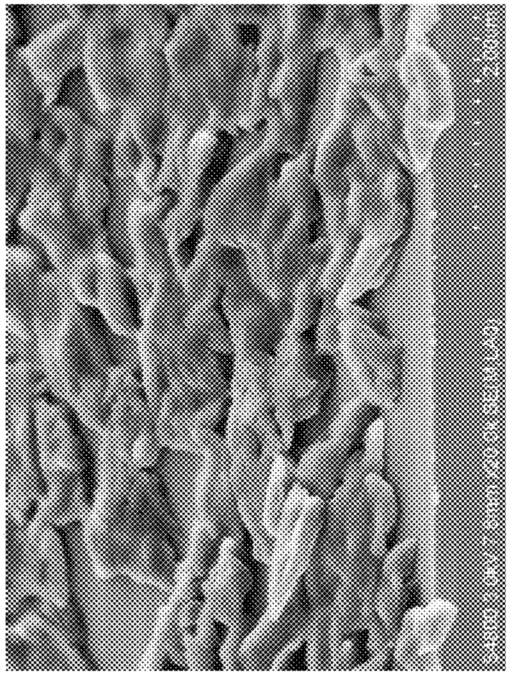
FIGS. 7A-7B (prior art) show SEM images AD1 dichroic dye after protonation.
Figure 7A:
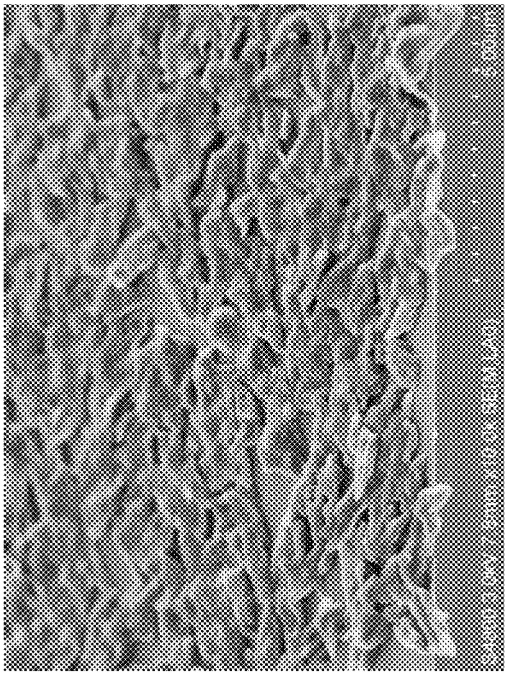

The film prepared using asymmetrical dyes both before and after protonation demonstrate low light scattering. The difference in the film morphology prepared that is responsible for lower scattering is illustrated in FIGS. 6-9. FIGS. 6A-6B, show a prior art film following spin coating and its change in FIGS. 7A-7B following protonation. As seen in these FIGS., there is considerable surface roughness that degrades the optical properties, such as increasing haziness. In contrast, FIGS. 8A-8B show a considerably smoother as-deposited azo dye layer using the dyes of the present invention. Even following protonation, as seen in FIGS. 9A-9B, the surface of the film is relatively smooth, resulting in improved optical properties, such as improved haziness.

Following chemical modification/protonation, a further protective layer 30 may be formed over the dye layer 20. Examples of protective layers include polymers such as polyacrylate, epoxy, or silicone. The polymer is used may be already polymerized material may be deposited and reacted in situ. The polymer material may also be a liquid crystal polymer, such as an acrylic polymer.

After coating the modified/protonated layer 20 with a deposited protective layer 30, polarizer 100 demonstrates high dichroism, low light scattering and stability against irradiation, humidity and heating.

In other embodiments, a multilayer polarizer may be formed by forming additional layers 20 on the surface of protective layer 30.

EXAMPLES

Synthesis of Precursors

Di-Alkyl Anilines

Example 1. N-butyl-N-pentylaniline

A mixture of N-butylaniline (5 mL, 31.1 mmol), n-pentylbromide (4.6 mL, 37.4 mmol), anhydrous $K_2CO_3$ (12.9 g, 93.4 mmol) and KI (0.64 g, 3.4 mmol) in 50 mL DMF and 100 mL toluene was refluxed with a Dean-Stark water trap for 24 hours. The progress of the reaction was monitored by GC-MS. After the reaction was completed, 200 mL of water was added to mixture. An organic layer was separated and the water part was extracted by 30 ml of toluene twice. The combined organic extracts were washed with brine and evaporated to dryness. The residue was putrefied by flash chromatography (silica gel—Hexane) furnishing N-butyl-N-n-penthyl aniline as a pale yellow oil, 6.6 g, in 97% yield; individually by GC-MS. GC-MS (m/z ($I_{rel.}$, %): 219 (52, $M^+$), 176 (91), 162 (98), 120 (100), 106 (85), 91 (20), 77 (37).

Example 2. N-butyl-N-hexylaniline

N-butyl-N-hexylaniline was fabricated according to the procedure for N-butyl-N-penthyaniline, starting from n-Hexylbromide (4.7 mL, 37.4 mmol). N-butyl-N-n-hextyl aniline was obtained as a pale yellow oil, 8 g, yield 89%, individually by GC-MS. GC-MS (m/z ($I_{rel.}$, %): 233 (12, $M^+$), 190 (32), 162 (51), 120 (100), 106 (63), 91 (10), 77 (26).

Example 3. N,N-dipentyl aniline

A mixture of Aniline (10 mL, 109.7 mmol), n-Pentylbromide (34 mL, 274.3 mmol), anhydrous potassium carbonate (92 g, 660 mmol) in 100 mL DMF and 200 mL toluene was refluxed in a Dean-Stark apparatus overnight. Then, a new portion of n-pentylbromide (5 mL, 40 mmol) and refluxing was continued. The reaction was monitored by GC-MS. After the reaction was completed, 300 mL water was added to the mixture, Toluene was separated and the water part was extracted by 50 ml of toluene twice. Toluene extracts were washed by brine and evaporated. The residue was purified by flash chromatography (silica gel—hexane) and N,N-dipentyl aniline was obtained as a pale yellow oil, 24 g, yield 96%, individually by GC-MS. GC-MS (m/z ($I_{rel.}$, %): 233 (44, $M^+$), 176 (100), 120 (98), 106 (63), 91 (12), 77 (26).

Bromoazobenzene (Azo-Coupling of Bromoaniline with Di-Alkyl Aniline)

General Procedure p-Bromoaniline (4.8 g, 28 mmol) was dissolved in 200 ml of 1N HCl and cooled to 0° C. A solution of sodium nitrite (1.93 g, 28 mmol) in 40 ml of water was cooled to 5° C. and then added dropwise to the p-bromoaniline solution at 0-2° C. and stirred after addition for 40 minutes. Then, this solution was added dropwise to a chilled solution of N,N-dialkylaniline (28 mmol) in a mixture 150 ml of ethanol and 50 ml of water. After mixing, a solution of 5 g of sodium acetate in 10 ml of water was added and the mixture was stirred overnight. The precipitate was filtered off, washed with water, dried and twice recrystallized from ethanol.

Example 4. 4-((4-bromophenyl)diazenyl)-N,N-dibutylaniline 4-((4-bromophenyl)diazenyl)-N,N-dibutylaniline was synthesized as described in the general procedure from 6.4 mL N,N-dibutylaniline (28 mmol); the yield of orange crystals is 5.8 g (53%).

$^1H$ NMR (400 MHz, $CDCl_3$) δ, ppm: 7.86 (d, J=9.1 Hz, 2H), 7.72 (d, J=8.5 Hz, 2H), 7.61 (d, J=8.7 Hz, 2H), 6.69 (d, J=9.1 Hz, 2H), 3.42 (t, J=7.8 Hz, 4H), 1.72-1.59 (m, 4H), 1.40-1.36 (m, 4H), 0.99 (t, J=7.3 Hz, 6H)

Example 5. 4-((4-bromophenyl)diazenyl)-N,N-dipentylaniline 4-((4-bromophenyl)diazenyl)-N,N-dipentylaniline was synthesized as described in the general procedure from 6.5 mL N,N-dipentylaniline (28 mmol) and resulted in 5.6 g of orange crystals. Yield 51%.

$^{1}$H NMR (400 MHz, $CDCl_3$) δ, ppm: 7.85 (d, J=9.0 Hz, 2H), 7.71 (d, J=8.4 Hz, 2H), 7.58 (d, J=8.7 Hz, 2H), 6.72 (d, J=9.0 Hz, 2H), 3.41 (t, J=7.6 Hz, 4H), 1.70-1.57 (m, 4H), 1.40-1.36 (m, 8H), 0.99 (t, J=7.3 Hz, 6H)

Example 6. 4-((4-bromophenyl)diazenyl)-N-butyl-N-pentylaniline 4-((4-bromophenyl)diazenyl)-N-butyl-N-pentylaniline was synthesized as described in the general procedure from 6.4 mL N-butyl-N-pentylaniline (28 mmol) and s 5.3 g of orange crystals were obtained. Yield 47%.

$^{1}$H NMR (400 MHz, $CDCl_3$) δ, ppm: 7.84 (d, J=9.2 Hz, 2H), 7.72 (d, J=8.5 Hz, 2H), 7.61 (d, J=8.8 Hz, 2H), 6.71 (d, J=9.0 Hz, 2H), 3.39-3.35 (m, 4H), 1.67-1.59 (m, 4H), 1.44-1.36 (m, 6H), 0.99 (t, J=7.1 Hz, 3H), 0.92 (t, J=6.9 Hz, 3H).

Example 7. 4-((4-bromophenyl)diazenyl)-N-butyl-N-hexylaniline 4-((4-bromophenyl)diazenyl)-N-butyl-N-hexylaniline was synthesized as described in the general procedure from 6.5 mL N-butyl-N-hexylaniline (28 mmol) and 5.9 g of orange crystals were obtained. Yield 53%.

$^{1}$H NMR (400 MHz, $CDCl_3$) δ, ppm: 7.85 (d, J=9.0 Hz, 2H), 7.71 (d, J=8.4 Hz, 2H), 7.58 (d, J=8.7 Hz, 2H), 6.72 (d, J=9.1 Hz, 2H), 3.38-3.35 (m, 4H), 1.66-1.59 (m, 4H), 1.39-1.33 (m, 8H), 0.98 (t, J=6.5 Hz, 3H), 0.92 (t, J=6.5 Hz, 3H).

Borylation of Bromo Azobenzene General Procedure

To the mixture of bromo azobenzene (1 equiv), bis (pinacolato)diborane (1.5 equiv) and anhydrous potassium acetate (3 equiv) in dry dioxane $PdCl_2$ (dppf) (0.02 equiv) were added under inert (nitrogen) atmosphere. The mixture was heated to 85° C. and stirred for 10 h. Then, the mixture was diluted with ethyl acetate and washed with brine. The resulting mixture after solvent evaporation was purified by flash chromatography (eluents are hexane or mixture of hexane/ethyl acetate 9/1) and recrystallized from methanol.

Example 8. N,N-dipentyl-4-((4-(4,4,5,5-tetramethyl-1,3,2-dioxaborolan-2-yl)phenyl)diaze-nyl)aniline N,N-dipentyl-4-((4-(4,4,5,5-tetramethyl-1,3,2-dioxaborolan-2-yl)phenyl)diaze-nyl)aniline was synthesized as described in the general procedure from 7 g (16.9 mmol) of 4-((4-bromophenyl)diazenyl)-N,N-dipentylaniline, 6.4 g (25.3 mmol) of bis(pinacolato)diborane, 5 g (50.6 mmol) of potassium acetate, 0.25 g (0.34 mmol) of $PdCl_2$(dppf) in 140 mL of dioxane and 6.6 g (yield 84%) of orange precipitate was obtained.

$^{1}$H NMR (400 MHz, $CDCl_3$) δ, ppm: 7.91 (d, J=7.8 Hz, 2H), 7.86 (d, J=9.3 Hz, 2H), 7.81 (d, J=7.5 Hz, 2H), 6.71 (d, J=9.3 Hz, 2H), 3.53 (t, J=8.0 Hz, 4H), 1.69-1.61 (m, 4H), 1.42-1.33 (m, 8H), 0.94 (t, J=6.7 Hz, 6H).

Example 9. N,N-dibutyl-4-((4-(4,4,5,5-tetramethyl-1,3,2-dioxaborolan-2-yl)phenyl)diaze-nyl)aniline N,N-dibutyl-4-((4-(4,4,5,5-tetramethyl-1,3,2-dioxaborolan-2-yl)phenyl)diaze-nyl)aniline was synthesized as described in the general procedure from 2 g (5.2 mmol) of 4-((4-bromo-phenyl)diazenyl)-N,N-dibutylaniline, 2 g (7.7 mmol) of bis(pinacolato)diborane, 1.5 g (15.5 mmol) of potassium acetate, 0.075 g (0.1 mmol) of $PdCl_2$(dppf) in 40 mL of dioxane. 2 g of orange oil were obtained, which slowly crystallized in low temperature. Yield 91%.

$^{1}$H NMR (400 MHz, $CDCl_3$) δ, ppm: 7.87 (d, J=7.5 Hz, 2H), 7.84 (d, J=9.0 Hz, 2H), 7.73 (d, J=8.2 Hz, 2H), 6.67 (d, J=9.0 Hz, 2H), 3.36 (t, J=8.0 Hz, 4H), 1.67-1.58 (m, 4H), 1.42-1.34 (m, 16H), 0.99 (t, J=7.3 Hz, 6H).

Example 10. N-butyl-N-hexyl-4-((4-(4,4,5,5-tetramethyl-1,3,2-dioxaborolan-2-yl)phenyl)-diazenyl)aniline N-butyl-N-hexyl-4-((4-(4,4,5,5-tetramethyl-1,3,2-dioxaborolan-2-yl)phenyl)-diazenyl)aniline was synthesized as described in the general procedure from 2 g (4.86 mmol) of 4-((4-bromophenyl)-diazenyl)-N-butyl-N-hexylaniline, 1.9 g (7.3 mmol) of bis(pinacolato)diborane, 1.4 g (14.5 mmol) of potassium acetate, and 0.070 g (0.097 mmol) of $PdCl_2$ (dppf) in 40 mL of dioxane. The yield is 3.9 g (87%) of orange fine crystals.

$^{1}$H NMR (400 MHz, $CDCl_3$) δ, ppm: 7.92 (d, J=7.5 Hz, 2H), 7.87 (d, J=9.2 Hz, 2H), 7.82 (d, J=8.3 Hz, 2H), 6.69 (d, J=9.0 Hz, 2H), 3.38-3.35 (m, 4H), 1.66-1.59 (m, 4H), 1.39-1.33 (m, 20H), 0.98 (t, J=6.5 Hz, 3H), 0.92 (t, J=6.5 Hz, 3H).

Example 11. N-butyl-N-pentyl-4-((4-(4,4,5,5-tetramethyl-1,3,2-dioxaborolan-2-yl)phenyl)-diazenyl) aniline N-butyl-N-pentyl-4-((4-(4,4,5,5-tetramethyl-1,3,2-dioxaborolan-2-yl)phenyl)-diazenyl)aniline was synthesized as described in the general procedure from 1 g (2.49 mmol) of 4-((4-bromophenyl)-diazenyl)-N-butyl-N-pentylaniline, 0.95 g (3.74 mmol) of bis(pinacolato)-diborane, 0.75 g (7.5 mmol) of potassium acetate, 0.040 g (0.05 mmol) of $PdCl_2$ (dppf) in 40 mL of dioxane. The yield is 1.0 g (90%) of orange fine crystals.

$^{1}$H NMR (400 MHz, $CDCl_3$) δ, ppm: 7.90 (d, J=8.5 Hz, 2H), 7.87 (d, J=8.5 Hz, 2H), 7.75 (d, J=8.8 Hz, 2H), 6.69 (d, J=9.0 Hz, 2H), 3.39-3.35 (m, 4H), 1.67-1.59 (m, 4H), 1.44-1.36 (m, 18H), 0.99 (t, J=7.3 Hz, 3H), 0.92 (t, J=7.1 Hz, 3H).

Synthesis of Bis-Azo Dyes by Cross-Coupling Reaction

General Procedure

A mixture of pinacol boronic ester (1 equiv), bromo azobenzene (1 equiv), sodium dodecyl sulfate (1% for water), toluene, water and butanol was degassed and flushed with nitrogen. Then, $PdCl_2$(dppf) (0.03 equiv) was added under nitrogen and the degassing was repeated. The resultant emulsion was heated to reflux with stirring, and $Na_2CO_3$ (4 equiv) in water was added dropwise over 5-10 min. The reaction mixture was refluxed until HPLC revealed that the reaction was complete. The reaction mixture was cooled, diluted with isopropyl alcohol, evaporated to dryness, suspended in dichloromethane and filtered through a short pad of silica, washed with dichloromethane and evaporated to dryness. Products were purified by hot extraction and/or crystallized from an appropriate solvent.

Example 12. 4,4'-([1,1'-biphenyl]-4,4'-diylbis(diazene-2,1-diyl))bis(N,N-dipentylaniline) (AD 55)

4,4'-([1,1'-biphenyl]-4,4'-diylbis(diazene-2,1-diyl))bis(N,N-dipentylaniline) (AD 55) was synthesized as described in the general procedure from 1 g (2.16 mmol) of N,N-dipentyl-4-((4-(4,4,5,5-tetramethyl-1,3,2-dioxaborolan-2-yl)phenyl)diazenyl)aniline, 0.9 g (2.16 mmol) of 4-((4-bromophenyl)-diazenyl)-N,N-dipentylaniline, 0.25 g of SDS, 20 ml of toluene, 20 mL of water, 5 mL of butanol, 0.05 g (0.065 mmol) $PdCl_2$(dppf) and 0.9 g (8.64 mmol) of $Na_2CO_3$ in 5 mL of water. The product was purified by hot extraction on silica gel sequentially by hexane and then by a mixture of 10% DCE in heptane (main fraction). The residue after evaporation of the main fraction was recrystallized from acetonitrile and fine red needles were obtained. The yield was 0.8 g, 62% (>99% purity by HPLC).

$^1$H NMR (400 MHz, $CDCl_3$) δ, ppm: 7.94 (d, J=9.2 Hz, 4H), 7.89 (d, J=9.2 Hz, 4H), 7.78 (d, J=9 Hz, 4H), 6.71 (d, J=9.3 Hz, 4H), 3.67 (t, J=7.7 Hz, 8H), 1.69-1.61 (m, 8H), 1.42-1.33 (m, 16H), 0.94 (t, J=6.5 Hz, 12H). HRMS (CI-TOF, m/z) calcd for $C_{44}H_{60}N_6$ [M+H]$^+$ 673.4879, found 673.4822.

Example 13. 4,4'-([1,1'-biphenyl]-4,4'-diylbis(diazene-2,1-diyl))bis(N-butyl-N-hexylaniline) (AD 46)]

4,4'-([1,1'-biphenyl]-4,4'-diylbis(diazene-2,1-diyl))bis(N-butyl-N-hexylaniline) (AD 46) was synthesized as described in the general procedure from 1.6 g (3.45 mmol) of N-butyl-N-hexyl-4-((4-(4,4,5,5-tetramethyl-1,3,2-dioxaborolan-2-yl)phenyl)diazenyl)aniline, 1.45 g (3.45 mmol) of 4-((4-bromophenyl)diazenyl)-N-butyl-N-hexylaniline, 0.25 g of SDS, 20 ml of toluene, 20 mL of water, 5 mL of butanol, 0.080 g (0.1 mmol) $PdCl_2$(dppf) and 1.g (13.8 mmol) of $Na_2CO_3$ in 5 mL of water. The product was purified by hot extraction on silica gel sequentially by hexane and then by a mixture of 10% DCE in heptane (main fraction). The residue after evaporation of the main fraction was recrystallized from acetonitrile furnishing 1.2 g of fine red crystals, 57% yield (>99% purity by HPLC).

$^1$H NMR (400 MHz, $CDCl_3$) δ, ppm: 7.94 (d, J=9.2 Hz, 4H), 7.89 (d, J=9.2 Hz, 4H), 7.79 (d, J=9.2 Hz, 4H), 6.72 (d, J=9.2 Hz, 4H), 3.40-3.36 (m, 8H), 1.66-1.61 (m, 8H), 1.44-1.36 (m, 16H), 0.99 (t, J=7.3 Hz, 6H), 0.92 (t, J=6.5 Hz, 6H). HRMS (CI-TOF, m/z) calcd for $C_{44}H_{60}N_6$ [M+H]$^+$ 673.4879, found 673.4932.

Example 14. 4,4'-([1,1'-biphenyl]-4,4'-diylbis(diazene-2,1-diyl))bis(N-butyl-N-pentylaniline)—AD45

4,4'-([1,1'-biphenyl]-4,4'-diylbis(diazene-2,1-diyl))bis(N-butyl-N-pentylaniline)—AD45 was synthesized as described in the general procedure from 1 g (2.22 mmol) of N-butyl-N-pentyl-4-((4-(4,4,5,5-tetramethyl-1,3,2-dioxaborolan-2-yl)phenyl)diazenyl)aniline, 0.9 g (2.22 mmol) of 4-((4-bromophenyl)diazenyl)-N-butyl-N-pentylaniline, 0.25 g of SDS, 20 ml of toluene, 20 mL of water, 5 mL of butanol, 0.050 g (0.7 mmol) $PdCl_2$(dppf) and 0.9 g (8.88 mmol) of $Na_2CO_3$ in 5 mL of water. The product was purified by hot extraction on silica gel sequentially by heptane and then by mixture of 10% dichloroethane in n-heptane. The residue after evaporation of the main fraction was recrystallized from acetonitrile and obtained as small dark red crystals. The yield was 0.8 g, 56% (>99% purity by HPLC).

$^1$H NMR (400 MHz, $CDCl_3$) δ, ppm: 7.92 (d, J=8.5 Hz, 4H), 7.88 (d, J=8.2 Hz, 4H), 7.77 (d, J=8.6 Hz, 4H), 6.70 (d, J=9 Hz, 4H), 3.39-3.35 (m, 8H), 1.67-1.59 (m, 8H), 1.44-1.36 (m, 16H), 0.99 (t, J=7.3 Hz, 6H), 0.92 (t, J=7.1 Hz, 6H). HRMS (CI-TOF, m/z) calcd for $C_{42}H_{56}N_6$ [M+H]$^+$ 645.4566, found 645.4613.

Example 15. N,N-dibutyl-4-((4'-((4-(dipentylamino)phenyl)diazenyl)-[1,1'-biphenyl]-4-yl)-diazenyl)aniline—AD44-55

N,N-dibutyl-4-((4'-((4-(dipentylamino)phenyl)diazenyl)-[1,1'-biphenyl]-4-yl)-diazenyl)aniline—AD44-55 was synthesized as described in the general procedure from 6.6 g (14.2 mmol) of N,N-dipentyl-4-((4-(4,4,5,5-tetramethyl-1,3,2-dioxaborolan-2-yl)phenyl)diazenyl)-aniline, 5.5 g (14.2 mmol) of 4-((4-bromophenyl)diazenyl)-N,N-dibutylaniline, 1 g of SDS, 100 ml of toluene, 80 mL of water, 15 mL of butanol, 0.310 g (0.426 mmol) $PdCl_2$(dppf) and 6 g (56.6 mmol) of $Na_2CO_3$ in 20 mL of water. The product was sequentially crystallized from isopropanol, heptane and acetonitrile and shiny dark red crystals were obtained. The yield was 6.8 g, 74% (>99% purity by HPLC).

$^1$H NMR (400 MHz, $CDCl_3$) δ, ppm: 7.93 (d, J=7.8 Hz, 4H), 7.88 (d, J=8.3 Hz, 4H), 7.77 (d, J=9.3 Hz, 4H), 6.70 (d, J=7.8 Hz, 4H), 3.39-3.34 (m, 8H), 1.67-1.60 (m, 8H), 1.42-1.32 (m, 12H), 0.99 (t, J=9.3 Hz, 6H), 0.94 (t, J=7.3 Hz, 6H). HRMS (CI-TOF, m/z) calcd for $C_{42}H_{56}N_6$ [M+H]$^+$ 645.4566, found 646.4689.

Example 16. 4,4'-([1,1'-biphenyl]4,4'-diylbis(diazene-2,1-diyl))bis(N,N-dibutylaniline)—AD1

4,4'-([1,1'-biphenyl]-4,4'-diylbis(diazene-2,1-diyl))bis(N,N-dibutylaniline)—AD1—was synthesized as described in the general procedure from 1 g (2.30 mmol) of N,N-dibutyl-4-((4-(4,4,5,5-tetramethyl-1,3,2-dioxaborolan-2-yl)phenyl)diazenyl)aniline, 0.9 g (2.3 mmol) of 4-((4-bromophenyl)-diazenyl)-N,N-dibutylaniline, 0.25 g of SDS, 20 ml of toluene, 20 mL of water, 5 mL of butanol, 0.05 g (0.065 mmol) of $PdCl_2$(dppf) and 0.9 g (8.64 mmol) of $Na_2CO_3$ in 5 mL of water. The product was sequentially crystallized from isopropanol, n-octane and acetonitrile and shiny red crystals were obtained. The yield was 1.1 g, 78% (>99% purity by HPLC).

$^1$H NMR (400 MHz, $CDCl_3$) ι, ppm: 7.93 (d, J=8.5 Hz, 4H), 7.90 (d, J=9.0 Hz, 4H), 7.77 (d, J=8.4 Hz, 4H), 6.71 (d, J=9.0 Hz, 4H), 3.37 (t, J=8.0 Hz, 8H), 1.66-1.58 (m, 8H), 1.42-1.37 (m, 8H), 0.99 (t, J=7.3 Hz, 12H). HRMS (CI-TOF, m/z) calcd for $C_{40}H_{52}N_6$ [M+H]$^+$ 617.4253, found 617.4332.

Example 17. Comparative Example. Synthesis of AD1 by Benzidine Diazotization Following by Bis Azo-Coupling Reactions 200 ml of 1N HCl was added to benzidine (6.5 g, 35.28 mmol) and stirred at 50° C. until completely dissolved. Then, the mixture was cooled to 0° C. (a slurry was obtained) and solution of $NaNO_2$ (5.1 g, 73.9 mmol) in 40 ml of water was added dropwise for 10-15 minutes at 0-2° C. (the precipitate dissolved), and was stirred for another 30 minutes. The diazotated solution was added dropwise within 15 minutes to a solution of diazotate N,N-dibutylaniline (18 ml, 79.5 mmol) in 150 ml of 1N HCl at 0° C. Then, a solution of 30 g of sodium acetate in 40 ml of water was added and the mixture was stirred for 10 h. The precipitate was filtered off, washed with water, aqueous acetone and dried (yield of crude product ~20 g).

A coarse purification of crude AD1 was carried out by flash chromatography and recrystallizations. The crude AD1 was dissolved in 600 ml of DCM and filtered through the layer of silica gel (6 cm diameter, 6 cm height), washed additionally with 1200 ml of DCM and evaporated to dryness. Then, the residue was recrystallized 2 times from 700 ml of acetonitrile and one time from 800 ml of heptane, furnishing 16 g of AD1 with a purity 94% by HPLC.

Fine purification was carried out by preparative column chromatography. A column (6 cm in diameter, 80 cm in length) was charged with 600 ml of silica gel (fraction 40-63 μm). AD1 was dissolved in 600 ml of mixture heptane-toluene 20:80 v/v, loaded on the column and eluted with a heptane-toluene mixture gradually increasing the content of toluene to 90%, in total 9 L of eluent. The first yellow fraction was discarded and the red fraction was collected with monitoring by TLC. The fraction obtained by TLC was collected, evaporated to dryness and recrystallized from acetonitrile and from heptane furnishing 8.2 g of AD1 as large red shiny crystals, 38% yield (>99% purity by HPLC).

Example 18. Bis-Azo-Dye Film Preparation by Spin-Coating

A glass substrate was washed with water and surfactant, dried and activated in an ozone chamber for 20 min. The one drop of 5% solution of an appropriate bis-azo-dye in toluene was spin-coated onto the substrate at 3000 rpm with further rotation for 30 s. Then the thin film was dried at 70° C. for 5 min. The obtained AD-1 film was subjected to a photoalignment process with linearly polarized light as described above. The light source wavelength is 420 nm.

Example 19. Chemical Modification of the Film

The aligned sample of bis-azo-dye film was protonated by sequential treatment with trifluoric anhydride and water vapor in a vapor deposition chamber as described above.

The DR and haziness data are listed in Table 2, above, showing a high dichroic ratio and low haziness even after protonation.

TABLE 2

Dichroic ratio (DR) and haziness of the film prepared from the dyes

| Entry | Dye | DR before protonation | DR after protonation | Haziness, % before protonation | Haziness, % after protonation |
|---|---|---|---|---|---|
| 1 | AD45 | 70 | 50 | 0.5-1 | 2-3 |
| 2 | AD46 | 45 | 20 | 0.5-1 | 2-3 |
| 3 | AD44-55 | 70 | 35 | 0.5-1 | 2-3 |
| 4 | AD55 | 50 | 35 | 3-4 | 10-12 |
| 5 | AD1 | 60 | 30 | 3-4 | 10-12 |

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

As used herein, terms “approximately”, “basically”, “substantially”, and “about” are used for describing and explaining a small variation. When being used in combination with an event or circumstance, the term may refer to a case in which the event or circumstance occurs precisely, and a case in which the event or circumstance occurs approximately. As used herein with respect to a given value or range, the term “about” generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term “substantially coplanar” may refer to two surfaces within a few micrometers (μm) positioned along the same plane, for example, within 10 μm, within 5 μm, within 1 μm, or within 0.5 μm located along the same plane. When reference is made to “substantially” the same numerical value or characteristic, the term may refer to a value within ±10%, ±5%, ±1%, or ±0.5% of the average of the values.

The invention claimed is:

1. An absorptive thin film polarizer, comprising:

a substrate;

an aligned dye layer comprising at least one dichroic bis-azo biphenyl dye of the following formula:

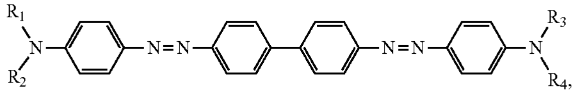

wherein substituents $R_1$, $R_2$, $R_3$, $R_4$ are individually selected from alkyl ($C_nH_{2n+1}$) or alkenyl ($C_nH_{2n-1}$) groups with n=1-18 and wherein at least one substituent among $R_1$ and $R_2$ is different from at least one substituent among $R_3$ and $R_4$ such that the dichroic bis-azo biphenyl dye is molecularly asymmetrical; and wherein the haziness of the thin film polarizer is in a range of 0.5-1%, and a dichroic ratio of the thin film polarizer is at least 40.

2. The absorptive thin film polarizer of claim 1, wherein the aligned dye layer is a photoaligned dye layer.

3. The absorptive thin film polarizer of claim 1, wherein the aligned dye layer is a protonated aligned dye layer.

4. The absorptive thin film polarizer of claim 1, further comprising a protective layer positioned over the aligned dye layer.

5. The absorptive thin film polarizer of claim 1, wherein the substrate is a flexible substrate.

6. The absorptive thin film polarizer of claim 5, wherein the flexible substrate is a polymeric substrate.

7. A display including the thin film polarizer of claim 1.

8. The absorptive thin film polarizer of claim 1, wherein the dichroic bis-azo biphenyl dye being formed from first and second benzidine-free mono-azo precursors by a cross-coupling reaction, the first and second benzidine-free mono-azo precursors being different from each other.

9. The absorptive thin film polarizer of claim 8, wherein the first benzidine-free mono-azo precursor is a bromoazobenzene dye synthesized by diazotization of 4-bromoaniline following by azo-coupling with an appropriate N,N-dialkylaniline.

10. The absorptive thin film polarizer of claim 8, wherein the second benzidine-free mono-azo precursor is a boronic ester derivative of azobenzene synthesized by borylation of bromoazobenzene.

* * * * *